United States Patent [19]

Smith, Jr.

[11] Patent Number: 5,109,485
[45] Date of Patent: Apr. 28, 1992

[54] METHOD FOR TRANSFERRING DATA BETWEEN MEMORIES

[75] Inventor: Walter H. Smith, Jr., Cambridge, Ohio

[73] Assignee: NCR Corporation, Dayton, Ohio

[21] Appl. No.: 689,117

[22] Filed: Apr. 22, 1991

Related U.S. Application Data

[63] Continuation of Ser. No. 238,641, Aug. 30, 1988, abandoned.

[51] Int. Cl.5 .................. G06F 13/00; G06F 12/00; G06F 15/16
[52] U.S. Cl. ........................... 395/200; 395/425; 395/600; 364/DIG. 1; 364/243; 364/254.3; 364/222.2; 364/260
[58] Field of Search ... 364/200 MS File, 900 MS File; 395/200, 425, 600; 365/189.01, 230.03

[56] References Cited

U.S. PATENT DOCUMENTS

| | | | |
|---|---|---|---|
| 4,528,624 | 7/1985 | Kamionka et al. | 364/200 |
| 4,601,009 | 7/1986 | Kogawa et al. | 364/900 |
| 4,796,222 | 1/1989 | Aichelmann et al. | 364/900 |
| 4,814,979 | 3/1989 | Neches | 364/200 |
| 4,831,582 | 5/1989 | Miller et al. | 364/200 |
| 4,853,848 | 8/1989 | Mitsuhashi et al. | 364/200 |
| 4,905,141 | 2/1990 | Brenza | 364/200 |

OTHER PUBLICATIONS

Microprocessors and Microsystems, vol 9, No. 4, May 1985, pp. 179-183, Guildford, Surrey, GB: B. Srinivasan et al.: "Recoverable file system for microprocessor systems".

IBM Technical Disclosure Bulleting, vol. 18, No. 8, Jan. 1976, pp. 2643-2644, New York, U.S.: R. F. Arnold et al.: "Checkpoint copying".

IBM Technical Disclosure Bulletin, vol. 23, No. 5, Oct. 1980, pp. 2091-2095, New York, U.S.; R. W. Collins et al.: "Directory Recovery".

Proc. of the Int'l. Conference on Supercomputing Systems, Washington, D.C., Dec. 16th-20th, 1985, pp. 265-272, IEEE, New York, U.S.; J. Kaunitz: "Database backup and recovery in transaction driven information systems".

Primary Examiner—Michael R. Fleming
Assistant Examiner—Gopal C. Ray
Attorney, Agent, or Firm—Richard W. Lavin

[57] ABSTRACT

A method for transferring data between a first and second memory in which the first memory is divided into a number of partitions. Stored in the first memory are a plurality of first data bits locating the begin and end block of data space in each of the partitions which has been allocated for storage of data therein. In the begin block of each partition, there is stored second data bits identifying the number of freespace maps for its associated partition together with the freespace maps locating the data that is to be transferred to the second memory. Using the information contained in the freespace maps, a processor transfers the data from the second memory to the first memory.

9 Claims, 7 Drawing Sheets

FIG. 5

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | C8 | C4 | D9 | F1 | 40 | E2 | E8 | E2 | E5 | D6 | D3 | F0 | F1 | 40 | 40 | 40 |
| 1 | 40 | 40 | 40 | 40 | 40 | 40 | 40 | 40 | F2 | F5 | F6 | 40 | F0 | F0 | F0 | F3 |
| 2 | F3 | F1 | F0 | F2 | F5 | F6 | F1 | 40 | 40 | 40 | 40 | C8 | 40 | 40 | 40 | 40 |
| 3 | 40 | 40 | 40 | 40 | 40 | 40 | 40 | 40 | 40 | 40 | 40 | 40 | 40 | 40 | 40 | 40 |
| 4 | 40 | 40 | 40 | 40 | 40 | 40 | 40 | 40 | 40 | 40 | F0 | F0 | F0 | F3 | F3 | 40 |
| 5 | 40 | 40 | 40 | 40 | 40 | 40 | 40 | 40 | 40 | 40 | 40 | 40 | 40 | 40 | 40 | 40 |
| 6 | 40 | 40 | 40 | 40 | 40 | 40 | 40 | 40 | 40 | 40 | 40 | 40 | 40 | 40 | 40 | 40 |
| 7 | 40 | 40 | 40 | 40 | 40 | 40 | 40 | 40 | 40 | 40 | 40 | 40 | 40 | 40 | 40 | 40 |
| 8 | 40 | 40 | 40 | 40 | 40 | 40 | 40 | 40 | 40 | 40 | 40 | 40 | 40 | 40 | 40 | 40 |
| 9 | 40 | 40 | 40 | 40 | 40 | 40 | 40 | 40 | 40 | 40 | 40 | 40 | 40 | 40 | 40 | 40 |
| A | 40 | 40 | 40 | 40 | 40 | 40 | 40 | 40 | 40 | 40 | 40 | 40 | 40 | 40 | 40 | 40 |
| B | 40 | 40 | 40 | 40 | 40 | 40 | 40 | 40 | 40 | 40 | 40 | 40 | 40 | 40 | 40 | 40 |
| C | 40 | 40 | 40 | 40 | 40 | 40 | 40 | 40 | 40 | 40 | 40 | 40 | 40 | 40 | 40 | 40 |
| D | 40 | 40 | 40 | 40 | 40 | 40 | 40 | 40 | 40 | 40 | 40 | 40 | 40 | 40 | 40 | 40 |
| E | 40 | 40 | 40 | 40 | 40 | 40 | 40 | 40 | 40 | 40 | 40 | 40 | 40 | 40 | 40 | 40 |
| F | 40 | 40 | 40 | 40 | 40 | 40 | 40 | 40 | 40 | 40 | 40 | 40 | 40 | 40 | 40 | 40 |

FIG. 6

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 01 | 05 | 56 | 41 | 53 | 54 | 20 | 20 | 20 | 20 | 20 | 20 | 20 | 20 | 20 | 20 |
| 1 | 20 | 20 | 20 | 20 | 20 | 20 | 20 | 20 | 20 | 20 | 20 | 20 | 20 | 20 | 20 | 20 |
| 2 | 20 | 20 | 20 | 20 | 20 | 20 | 20 | 20 | 20 | 20 | 20 | 20 | 20 | 20 | 20 | 20 |
| 3 | 20 | 20 | 20 | 20 | 20 | 20 | 20 | 20 | 20 | 20 | 20 | 20 | 20 | 20 | 20 | 20 |
| 4 | 20 | 20 | 20 | 20 | 20 | 20 | 20 | 20 | 20 | 20 | 20 | 20 | 20 | 20 | 20 | 20 |
| 5 | 20 | 20 | 20 | 20 | 20 | 20 | 20 | 20 | 20 | 20 | 20 | 20 | 20 | 20 | 20 | 20 |
| 6 | 20 | 20 | 20 | 20 | 20 | 20 | 20 | 20 | 20 | 20 | 20 | 20 | 20 | 20 | 20 | 20 |
| 7 | 20 | 20 | 20 | 20 | 20 | 20 | 20 | 20 | 20 | 20 | 20 | 20 | 20 | 20 | 20 | 20 |
| 8 | F8 | 00 | 00 | 00 | 00 | 00 | 00 | 00 | 00 | 00 | 00 | 00 | 00 | 00 | 00 | 00 |
| 9 | 00 | 00 | 00 | 00 | 00 | 00 | 00 | 00 | 00 | 00 | 00 | 00 | 00 | 00 | 00 | 00 |
| A | 00 | 00 | 00 | 00 | 00 | 00 | 00 | 00 | 00 | 00 | 00 | 00 | 00 | 00 | 00 | 00 |
| B | 00 | 00 | 00 | 00 | 00 | 00 | 00 | 00 | 00 | 00 | 00 | 00 | 00 | 00 | 00 | 00 |
| C | 00 | 00 | 00 | 00 | 00 | 00 | 00 | 00 | 00 | 00 | 00 | 00 | 00 | 00 | 00 | FF |
| D | FF | FF | FF | FF | FF | FF | FF | FF | FF | FF | FF | FF | FF | FF | FF | FF |
| E | FF | FF | FF | FF | FF | FF | FF | FF | FF | FF | FF | FF | FF | FF | FF | FF |
| F | FF | FF | FF | FF | FF | FF | FF | FF | FF | FF | FF | FF | FF | FF | FF | FF |

62

METHOD FOR TRANSFERRING DATA BETWEEN MEMORIES

This is a continuation of Ser. No. 238,641, filed on Aug. 30, 1988, now abandoned.

BACKGROUND OF THE INVENTION

The present invention is directed to data base systems and more particularly to a method of performing a backup dump of the contents of a data base system.

In modern day retail merchandising systems, which consist of a primary data terminal device and a plurality of remote secondary terminal devices, data generated by the secondary terminal devices during a merchandising operation is normally transmitted and stored in a disk file located in the primary terminal device. A backup system has been utilized to ensure that no data is lost when the primary terminal device becomes disabled. The backup system includes a second primary terminal device which receives the same data as the first primary terminal device during a merchandising operation. When the second primary terminal device becomes disabled or is withdrawn from operation, the data stored in the first primary terminal device is required to be downloaded to the second primary terminal device at the conclusion of a day's operation so as to update the data in the second primary terminal device. In downloading the data base, all the data space in the disk file is transferred regardless of whether the file contains stored data, hereinafter referred to as valid data, or empty space which contains no data, hereinafter referred to as invalid data. As the memory capacity of the present day terminal devices increases, the time required for downloading the data base of the first primary terminal device has increased to the point that the operation cannot be completed before the start of the next day's activities.

It is therefore a principal object of this invention to provide a method for downloading a disk file which transfers only the valid data stored in the disk file.

SUMMARY OF THE INVENTION

This and other objects of the invention are fulfilled by dividing the disk file of the primary terminal into a plurality of defined memory areas, storing in a portion of the disk file of the primary terminal device a directory listing the location of the disk space in each of the defined memory areas in the disk file allocated for the storage of data, and storing a freespace map in each of the defined memory areas of the disk file indicating the location of valid data in that area. In downloading the valid data, the disk space containing only valid data is read and the operating system of the primary terminal device transfers the valid data stored in this space to the second primary terminal device.

BRIEF DESCRIPTION OF THE DRAWINGS

Additional advantages and features of the present invention will become apparent and fully understood from a reading of the following description, taken in conjunction with the drawings, in which:

FIG. 5 is an illustration of a directory block of data of the disk file which contains data indicating the location of the begin block and the end block of allocated data space in a partition;

FIG. 6 is an illustration of the begin block of a partition;

DESCRIPTION OF THE PREFERRED EMBODIMENT

Figure 1:
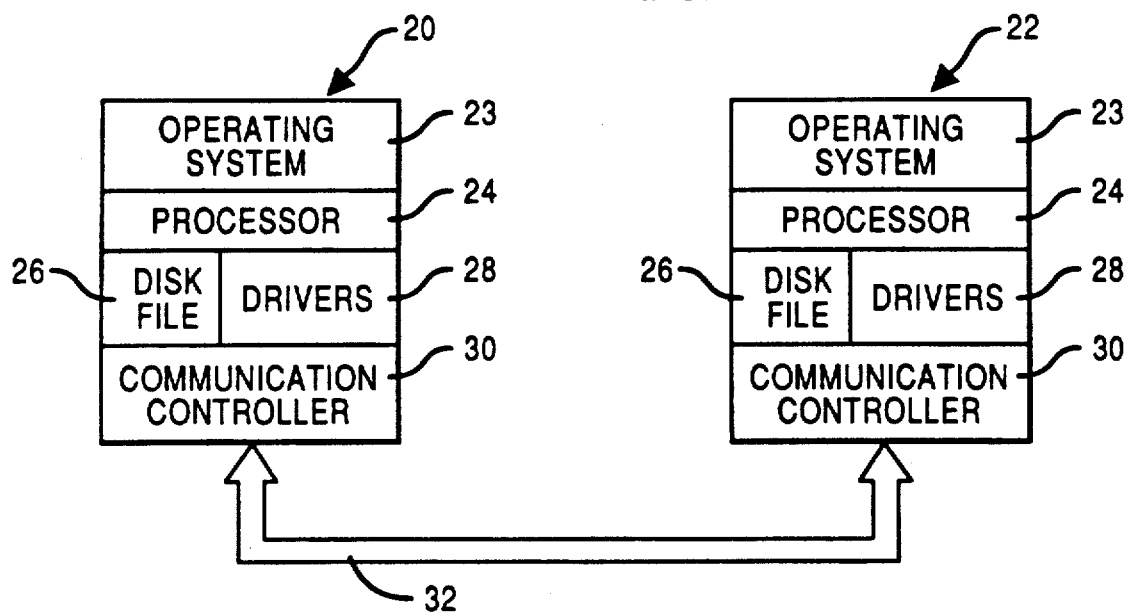
FIG. 1 is a schematic block diagram of the first and second primary terminal devices showing the arrangement for the downloading of the data from the first terminal device to the second terminal device.

Referring now to FIG. 1, there is shown a schematic block diagram of the first and second primary terminal devices indicated by numerals 20 and 22 arranged for a downloading operation. Each of the terminal devices 20, 22 includes an operating system 23, a processor 24, a disk file 26 and a plurality of disk drivers 28 for writing and reading data in the disk file and a communication controller 30 for controlling the transfer of data over a communication bus 32 coupled between the terminal devices 20 and 22.

Figure 2:
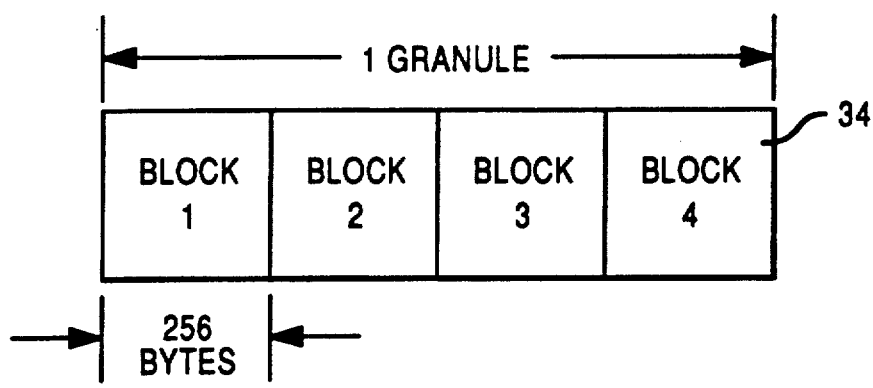
FIG. 2 is an illustration showing how a portion of the disk file is constructed and the number of bytes of data that can be stored at a specific location in the disk file.

Referring now to FIG. 2, there is illustrated a portion of the disk file showing how the disk file 26 is divided into specific storage areas. The basic storage area in the disk file is a block of data 34 which comprises a maximum of 256 bytes of data. Four blocks of data comprise one granule containing a maximum of 1024 bytes of data.

Figure 3:
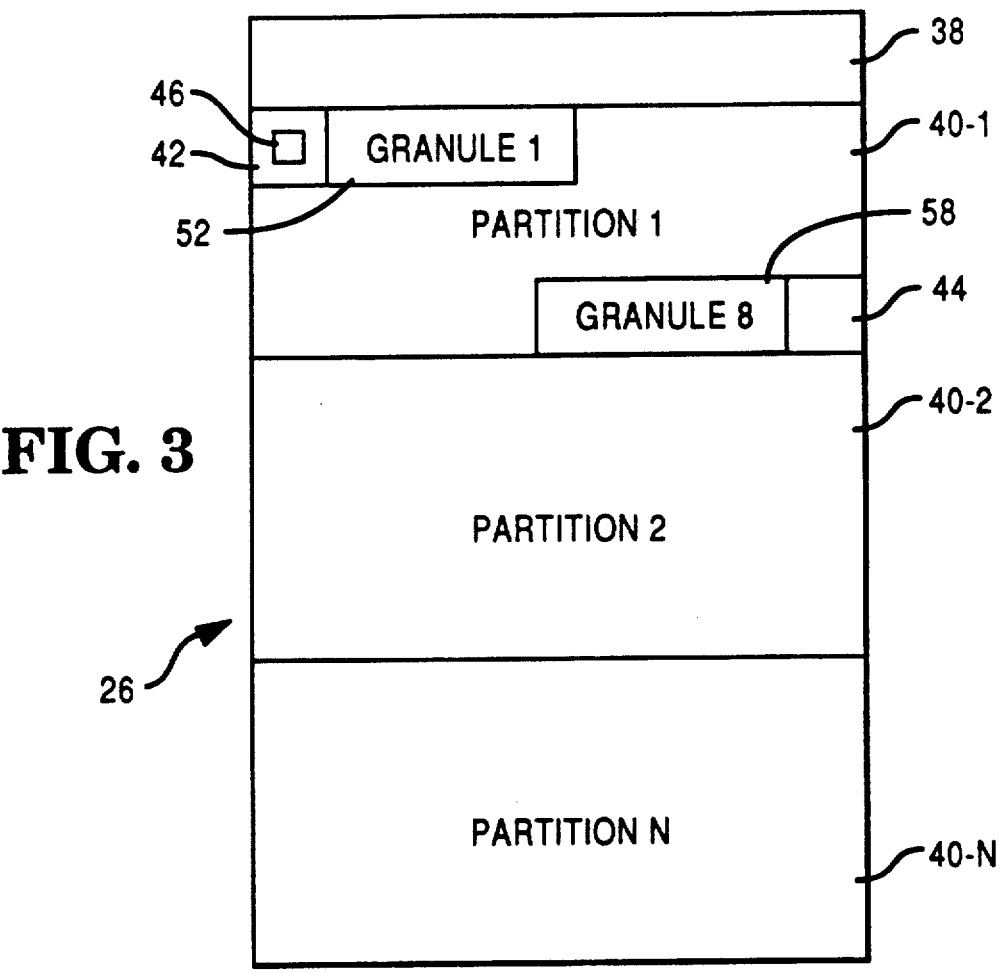
FIG. 3 is a schematic block diagram of the disk file of FIG. 1 showing how the disk file is divided into partitions together with the location of the directory blocks of data of the disk file.

Referring now to FIG. 3, there is shown a schematic diagram of the disk file 26 (FIG. 1) in which the file of the present embodiment is divided into a number of partitions 40-1 to 40-N inclusive. The first row of data 38 of the disk file 26 contains thirty-three blocks of data comprising a directory in which the data represents the location of a first or begin block 42 and a last or end block 44, which blocks define the allocated disk space in each of the partitions 40-1 to 40-N in which data may be stored. The end block 44 in each of the partitions 40-1 to 40-N inclusive may be located at any position in the partition depending on the desired amount of data to be stored therein. In the present embodiment, the disk file 26 (FIG. 1) in each of the terminals may contain up to four partitions 40-1 to 40-N inclusive. As will be described more fully hereinafter, the begin block 42 for each partition contains data representing the number of freespace maps that are located in the begin block. A freespace map locates the number of granules of data in the partition which have valid data stored therein.

Figure 4:
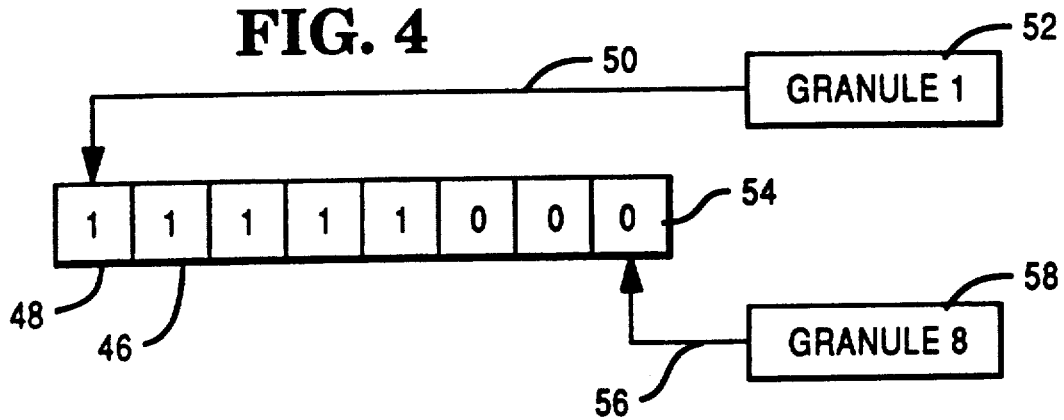
FIG. 4 is a diagrammatic representation of how each bit location in a byte of freespace map is coupled to a corresponding granule of disk space.

Referring now to FIG. 4, there is illustrated a diagrammatic representation of a eight bit portion 46 of a freespace map 62 (FIG. 6) located in the begin block 42 (FIG. 3) of each partition in which each bit in the map indicates whether or not valid data is contained in a corresponding granule of data. Each bit of the freespace map 46 may contain a binary one comprising a flag which represents that a corresponding granule of data in the partition contains valid data that is to be transferred. Thus the first bit 48 in the freespace map 46 represents the storage condition of a corresponding granule 52 of data, as indicated by the line 50. When the granule 52 is allocated by the operating system 23 (FIG. 1) for storage of valid data, the flag bit is set by the system 23 to one in block 48 of the freespace map 46. Thus, if the portion 46 contains the hexadecimal data F8 (FIG. 6), the blocks 48 would contain the binary bits illustrated. The eighth block 54 represents the storage condition of the number eight granule 58, as indicated by the line 56, and is set to a binary zero, representing that no valid data is stored in granule 58.

Referring now to FIG. 5, there is shown a typical directory block located in the directory row 38 (FIG. 3) of the disk file 26 (FIG. 1). As shown, the first row in the directory block contains hexadecimal data at locations 05-0C inclusive which indicates, according to a predetermined code, that this information relates to the first partition 40-1 (FIG. 3). In the second row starting at location 1C through location 20 in the third row, the hexadecimal data F0, F0, F0, F3 and F3 located therein indicates that the begin block of partition 40-1 is block 33. The hexadecimal data F0, F2, F5, F6 and F1 in locations 22-26 inclusive, in the third row represent the location of the end block of the partition, which in the present embodiment is 2561. By subtracting 33 from 2561, the partition 40-1 is indicated as having up to 2528 blocks of allocated data space, of which only the valid data contained therein is to be transferred.

Referring now to FIG. 6, there is shown the begin block 33 referred to in the description of FIG. 5, in partition 40-1. The hexadecimal signal 01 found at location 00 indicates that there is one freespace map for this partition. Each freespace map represents up to one megabyte of data. The freespace map indicated by the reference character 62 includes the digits 00 when no valid data is stored in the corresponding granules of data and includes hexadecimal data such as F8 (FIG. 4) which represents the granules having valid data stored therein. The freespace map starts at location 80 and extends through location CE, allowing the map to cover 632 granules of disk space.

Each partition may contain more than one freespace map, depending on the amount of data stored on the disk file. As previously described, when a granule is allocated for the storage of valid data by the operating system of the terminal device, a flag bit is set to 1 in the byte of the freespace map corresponding to that location in the physical disk layout, indicating an allocated granule. As will be described more fully hereinafter, by searching backwards from location CE at the end of the map, it will be found, in the present example, that the first non-zero byte F8 is at location 80, indicating the location of blocks of disk space that contain valid data. Since none of the bit flags in map 62 between locations CE and 81 have been turned on, no valid data is contained beyond the blocks represented by byte F8 and the downloading operation will be controlled so as to ignore these blocks. The digits 20 and FF shown in FIG. 6 are merely filler data indicating empty space.

Figure 7:
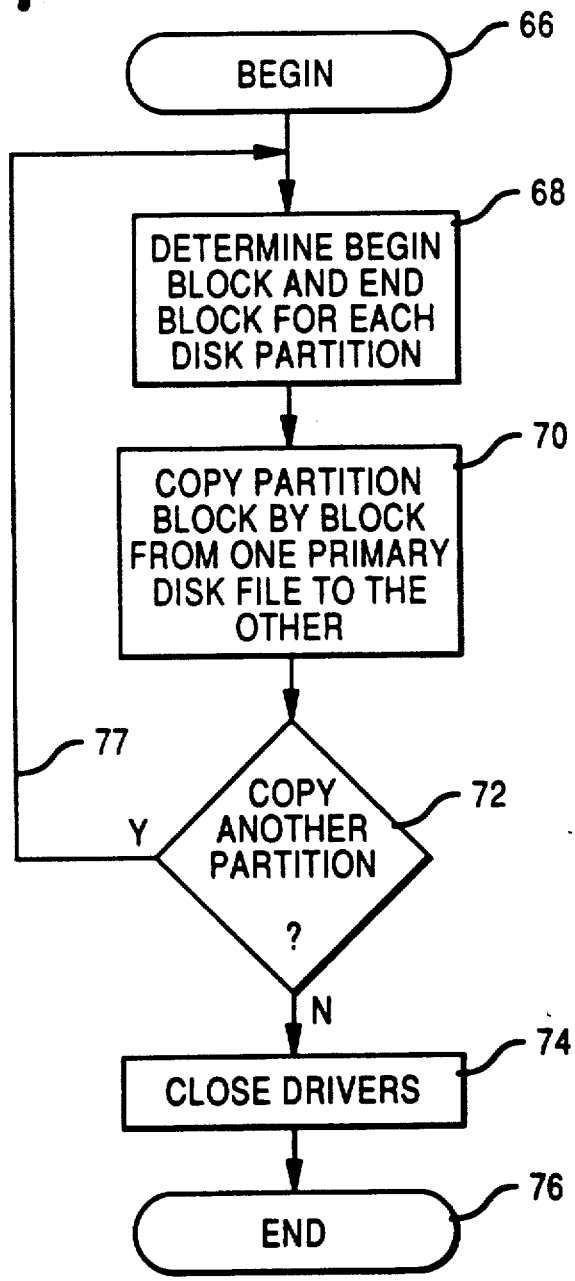
FIG. 7 is a flow chart of the overall backup downloading program.

Referring now to FIG. 7, there is shown a flow chart of an overall view of a downloading operation which begins (block 66) by the processor 24 in terminal device 20 determining the begin block and the end block of each disk partition (block 68) in the disk file 26 by reading the information in the directory row 38 of the disk file 26 (FIGS. 3 and 5) and then reading the freespace maps in the begin block to determine the location of the valid data in the partition. After detecting the valid data contained in the disk file, the processor 24 in the first primary terminal device 20 will enable the drivers 28 to transfer the valid data in each of the partitions by reading the data block by block from the primary disk file 26 to the other primary disk file 26 in the second primary terminal device 22 (block 70). As the valid data in each partition is transferred to the terminal device 22, the processor 24 in terminal device 20 will detect if another partition is to be transferred (block 72). If it is, the processor will return over line 77 to block 68 until all of the valid data in each of the partitions has been transferred. This processor will then disable the drivers (block 74) to complete (block 76) the transfer operation.

Figure 8A:
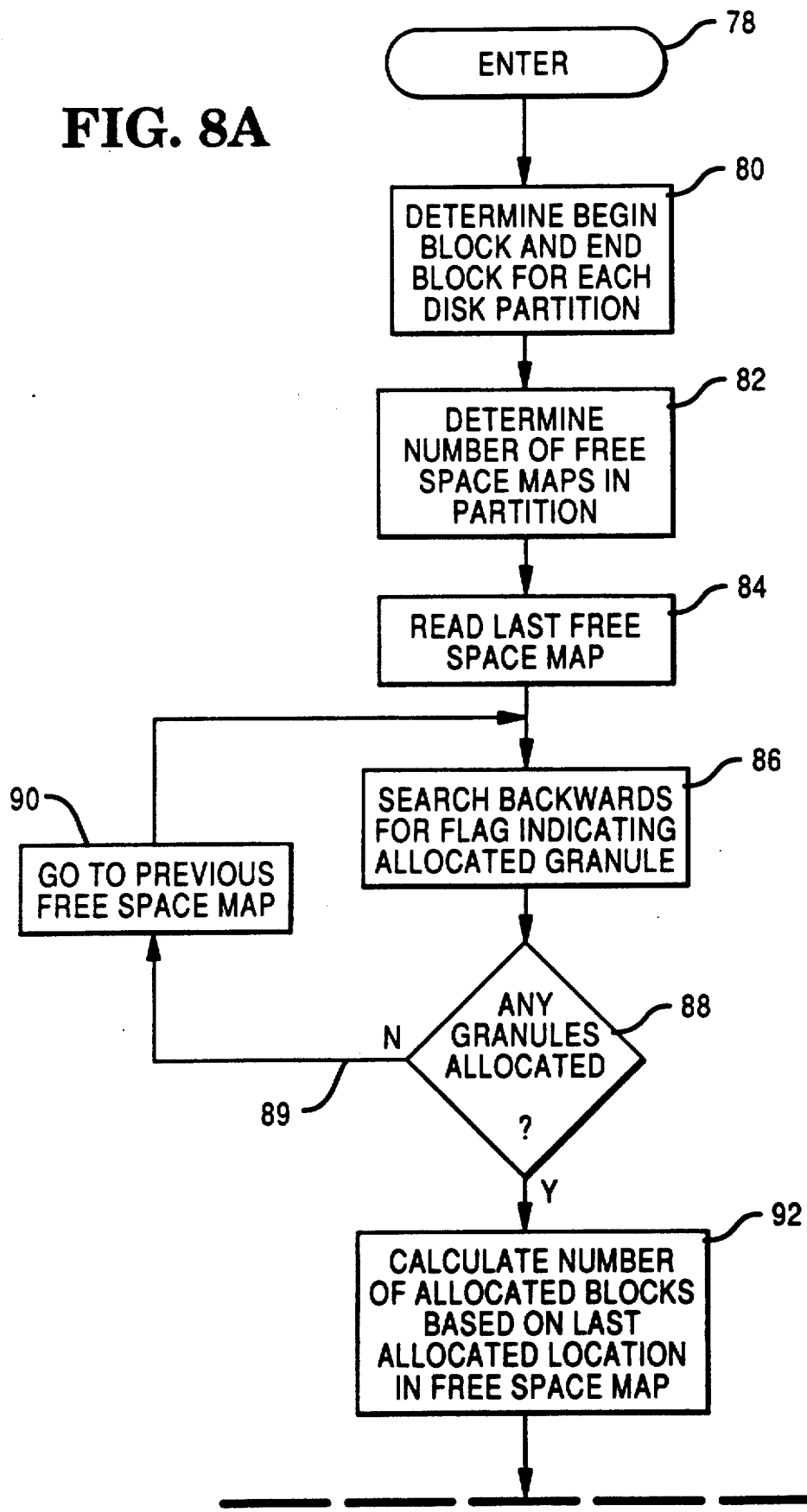
FIGS. 8A and 8B show a flow chart of a backup subroutine for detecting the location of the begin block and the end block of the data in each partition that is to be downloaded.
Figure 8B:
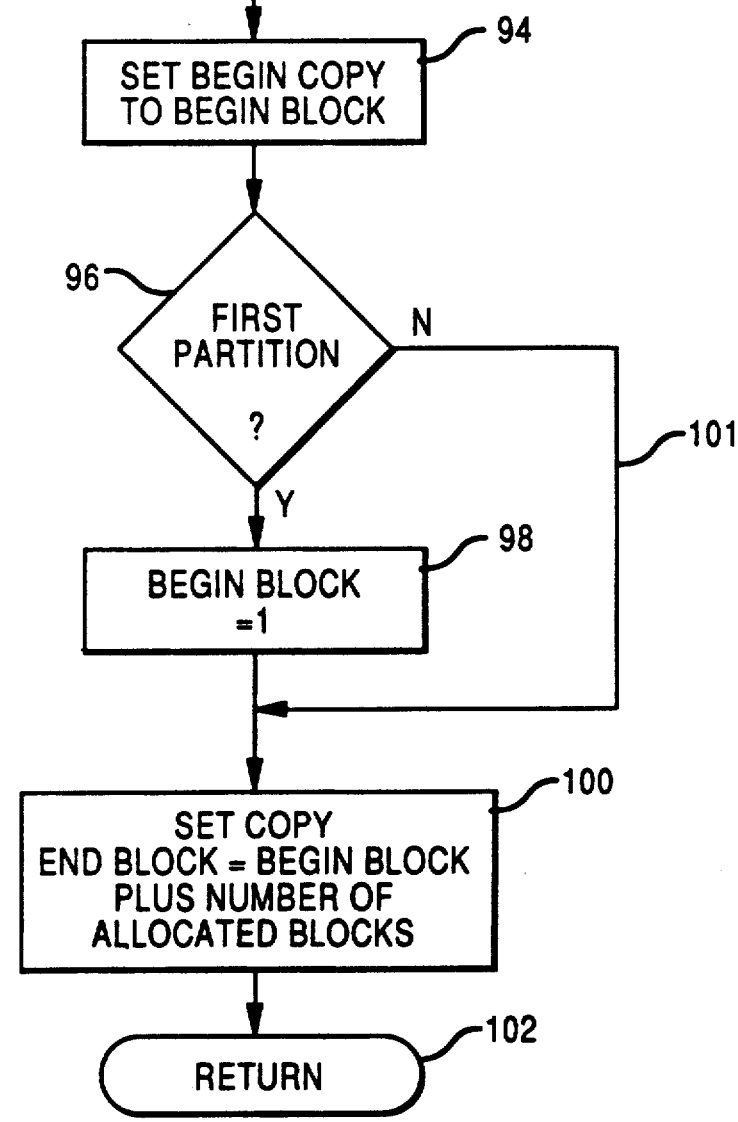

Referring now to FIGS. 8A and 8B, there is shown a flow chart of the operation for determining the begin block and the end block of the valid data in each of the partitions. The processor 24 in terminal device 20 (FIG. 1) will start the operation (block 78) by determining the location of the begin block and the end block for each partition (block 80) by reading the blocks of data in the directory row 38 of the disk file 26 (FIG. 3). After detecting the location of the begin block in a partition, the processor will read the begin block (FIG. 6) to determine the number of freespace maps in the partition (block 82). The processor will then read the last freespace map (block 84) byte-by-byte for a flag indicating an allocated granule (FIG. 4) representing the storage of valid data. This is accomplished by reading backward from the last bit location on the freespace map for locating a flag indicating an allocated granule (block 86). If the processor cannot find any flag in the freespace map (block 88), the processor will return over line 89 to the previous freespace map (block 90) and repeat the operation for detecting an allocated granule (block 86). If the processor detects a flag in one of the blocks of data in the freespace map (block 88), the processor will then calculate the number of allocated blocks based on the last allocated location in the freespace maps (block 92) and then set the begin copy sequence to the begin block (block 94) position. The processor will then determine if the freespace map is associated with the first partition (block 96) and if it is, it will then set the begin block to the first block in row 1 of the disk file (block 98) which is the directory row 38 of the disk file (FIG. 3) which directory row is transferred with the valid data. The processor will then set the end block equal to the begin block plus the number of allocated blocks (block 100) and then return to its original position (block 102). If the partition to be copied is not the first partition, the system will go over line 101, bypassing the step of setting the begin block to the first block of the directory row of the disk file 26.

Figure 9:
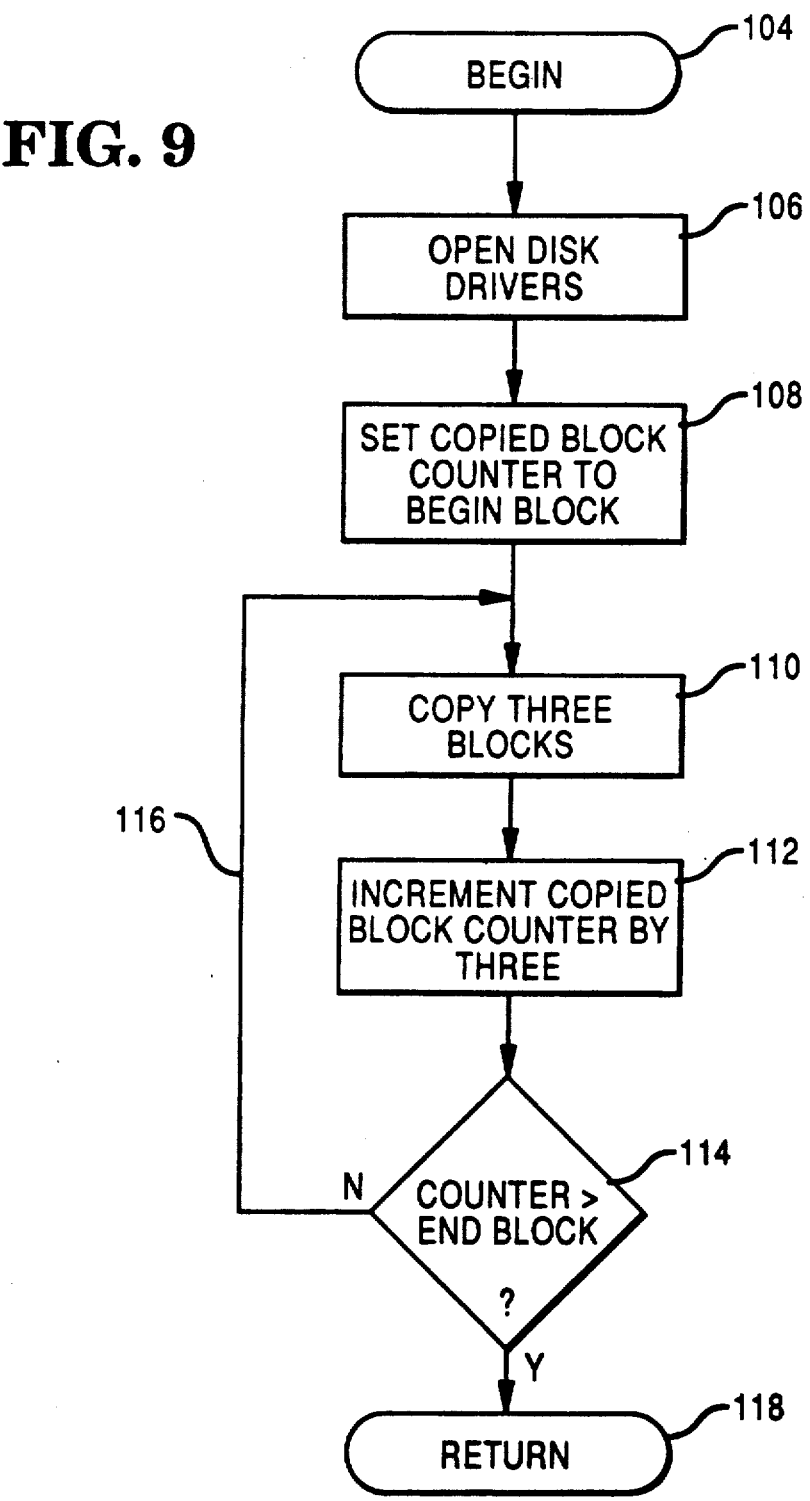
FIG. 9 is a flow chart of a backup routine for downloading the valid data.

Referring now to FIG. 9, there is shown a flow chart of the downloading process in which the processor 24 of terminal device 20 will begin (block 104) by opening or operating the disk drivers 28 (FIG. 1) (block 106) for each of the partitions 40 (FIG. 3) and then set a counter (not shown) located in the disk file to the begin block (108) location. The processor will then copy three blocks of valid data (block 110) since this has been found to be the optimum transfer rate of the communication system. After the three blocks of valid data have been transferred, the processor increments the counter by three (block 112) and then checks to see if the output count of the counter is greater than the end block number (block 114). If it is not, it will then return over line 116 and copy the next three blocks (block 110) of data. If the count is greater than the number associated with the end block, the processor will return to its initial operating position (block 118).

It will be seen that by establishing a directory portion of the disk file to contain information which points to the location of the begin block and the end block of each partition which is allocated to contain data and then storing in each of the begin blocks the freespace maps which contain flags indicating which granules contain valid data, only valid data will be transferred to the backup primary terminal for updating the data base in the minimum amount of time.

While the features of the invention have been illustrated and described, it should be readily apparent to those skilled in the art that many changes and modifications can be made in the method of the invention presented without departing from the spirit and scope of the invention. Accordingly, the present invention should be considered as encompassing all such changes and modifications of the invention that fall within the broad scope of the invention as defined by the appended claims.

What is claimed is:

1. In a data processing system including a first processing unit having a first memory means and first processing means for controlling the operation of said first memory means and a second processing unit including a second memory means and second processing means controlling the operation of the second memory means, a method for transferring data from a first memory means under the control of said first processing means to said second memory means comprising the steps of:

dividing the first memory means into a plurality of first defined memory areas, each containing a plurality of second defined memory areas comprising blocks of data space in which data that is to be transferred is stored, each of said first defined memory areas including a begin block of data space and an end block of data space defining the number of second defined memory areas contained in the first memory area;

storing in a portion of the first memory means first data bits which designate the location of the begin block and the end block of data space in each of the first defined memory areas;

storing in each of the begin blocks of each first defined memory areas second data bits identifying the number and location of the second defined memory areas containing data which is to be transferred to the second memory means;

reading the first and second data bits to locate the data in the designated memory space in the second defined memory areas that is to be transferred to the second memory means; and transferring the data from the designated memory space in the second defined memory areas in the first memory means to the second memory means.

2. The method of claim 1 which further includes the step of storing third data bits in the begin block of data space in each of the first defined memory areas indicating the number of second data bits stored in the associated defined memory area.

3. In a data processing system including a first processing unit having a first memory and first processing means controlling the operation of said first processing unit and said first memory and a second processing unit including a second memory and a second processing means controlling the operation of said second processing unit and said second memory, a method for transferring data from said first memory to said second memory comprising the steps of:

partitioning a first portion of the first memory into a plurality of separate first storage areas;

locating in each of the first storage areas a plurality of second contiguous storage areas including a begin second storage area and an end second storage area locating the number of second storage areas positioned between the begin and end second storage areas which are available to store valid data;

storing in a second portion of the first memory first data bits locating the begin and end second storage areas in each of the first storage areas;

storing in each of the begin second storage area second data bits identifying the location in the associated first storage area of the second storage areas that contain data that is to be transferred to the second memory;

reading the first and second data bits to locate the second storage area in each of the first storage areas that contain data that is to be transferred to the second memory; and transferring the data that has to be transferred from the first memory to the second memory.

4. The method of claim 3 which further includes the steps of:

dividing each of the second storage ares into a predetermined number of blocks of storage space for storing a plurality of data bits;

storing the second data bits in a sequence in said second storage areas forming a map of a portion of the associated first storage area indicating the number of second storage areas contained in the first storage area in which data is stored; and storing in the begin second storage area in each of the first storage areas, third data bits representing the number of maps stored in the begin second storage area.

5. The method of claim 4 in which the first data bits locate the first and last block of storage space that data can be stored in the associated storage area.

6. The method of claim 5 which further includes the steps of generating a fourth data bit when data is stored in a block of storage space and generating a fifth data bit when no data is stored in a block of storage space, said fourth and fifth data bits forming said map.

7. The method of claim 4 in which the step of transferring data from the first memory to the second memory includes the steps of:

detecting the location of the begin second storage area in each of the first storage areas;

detecting the location of the end second storage area in each of the first storage areas;

detecting the number of second storage areas that are available to contain data that may be transferred to the second memory by subtracting the location of the begin second storage area from the location of the end second storage area in each of the first storage areas;

detecting the location of the data to be transferred in the second storage areas detected; and transferring the data to the second memory.

8. A method for transferring data from a first disk file to a second disk file in which each of the disk files includes processing means for controlling the operation of said first and second disk files comprising the steps of:
- dividing a first portion of the first disk file into a plurality of partitions each comprising the plurality of blocks of contiguous storage areas;
- forming a predetermined number of blocks of storage areas into a storage unit for storing data to be transferred;
- storing in a second portion of the first disk file first data bits which identify the location of a begin block of storage area and an end block of storage area whose positions define by location the number of contiguous storage units in each of the partitions in which data can be stored;
- storing in the begin block in each of the partitions second and third data bits comprising a free space map of the storage units in the associated partition in which data can be stored, said second data bit identifying the location in an associated storage unit of a block of storage area containing data that is to be transferred to the second disk file and the third data bit indicating that no data is stored in the block of storage area;
- storing in each of the begin blocks hexadecimal binary data bits indicating the number and location of the free space maps in the associated partition;
- reading the hexadecimal binary data bits and the first data bits to locate the last free space map in the partition;
- detecting the location of the storage units containing data that is to be transferred to the second disk file by reading the first data bits in the preceding free space maps; and
- transferring the data in the designated storage units that is to be transferred from the first disk file to the second disk file upon detecting the location of the storage units containing data that is to be transferred to the second disk file.

9. The method of claim 8 which further includes the step of storing fourth data bits in the begin block in each of the partitions representing the number of freespace maps stored in the begin block.

* * * * *